(12) United States Patent
Regula (10) Patent No.: US 7,311,636 B1
(45) Date of Patent: Dec. 25, 2007

(54) REVERSE ATTACHMENTS FOR MOTORCYCLES

(76) Inventor: Peter P. Regula, 78 Chelsea La., Forsyth, GA (US) 31029

( * ) Notice: Subject to any disclaimer, the term of this patent is extended or adjusted under 35 U.S.C. 154(b) by 99 days.

(21) Appl. No.: 11/179,906

(22) Filed: Jul. 12, 2005

(51) Int. Cl.
*F16H 3/44* (2006.01)

(52) U.S. Cl. ..................................... 475/326

(58) Field of Classification Search ............... 475/326; 180/230, 366, 337, 383, 369, 344, 364
See application file for complete search history.

(56) References Cited

U.S. PATENT DOCUMENTS

| | | | |
|---|---|---|---|
| 4,083,421 A * | 4/1978 | Van Horn et al. | 180/369 |
| 4,523,491 A | 6/1985 | Dittmann, Jr. | |
| 4,869,332 A | 9/1989 | Fujita et al. | |
| 4,870,874 A | 10/1989 | Ito | |
| 4,923,028 A | 5/1990 | Yamashita et al. | |
| 5,024,113 A | 6/1991 | Ito et al. | |
| 5,069,304 A | 12/1991 | Mann | |
| 5,581,136 A * | 12/1996 | Li | 310/67 R |
| 5,964,678 A * | 10/1999 | Hanada et al. | 475/297 |
| 6,054,826 A | 4/2000 | Murakami et al. | |
| 6,199,651 B1 * | 3/2001 | Gay | 180/220 |
| 6,267,192 B1 | 7/2001 | Maier et al. | |
| 6,457,381 B1 | 10/2002 | Nonaka et al. | |
| 2002/0007688 A1 | 1/2002 | Punko | |

* cited by examiner

*Primary Examiner*—Dirk Wright
(74) *Attorney, Agent, or Firm*—Myers & Kaplan, LLC; Sandra M. Drummond (57) ABSTRACT

A motorcycle wheel attachment for replacement for a rear sheave or sprocket that attaches to the hub of the rear wheel. The outer perimeter of the apparatus resembles the outer perimeter of the replaced motorcycle sheave/sprocket so that the respective drive belt or chain can be affixed around the perimeter. With respect to the belt or chain, the engine and transmission, the attachment functionally replaces the sheave/sprocket. The attachment includes an enclosed inner gear system having a locked and unlocked position. In the locked position, none of the gears rotate with respect to the exterior of the attachment. In the unlocked position, the gears couple to the movement of the exterior of the attachment as well as the drive force exerted by the belt or chain. This coupled movement allows the attachment and wheel to rotate in a reverse direction using the forward drive of the engine, thereby giving the motorcycle reverse power.

8 Claims, 8 Drawing Sheets

Fig_1

Fig_2

Fig. 15

REVERSE ATTACHMENTS FOR MOTORCYCLES

BACKGROUND

I. Field of the Invention

The present invention relates generally to the field of motorcycles and more particularly to a motorcycle wheel attachment that enables the motorcycle rear wheel to rotate in a reverse direction.

II. Description of the Related Art

It is well-known that present motorcycles typically lack a reverse gear in the transmission. As such, riders must maneuver their motorcycles using their feet while sitting on the motorcycle or otherwise push the motorcycle when they desire to move it in a reverse direction. This manual maneuvering can be very difficult, particularly when pushing the motorcycle up an incline. Although attempts have been made to alter motorcycle transmissions to add a reverse gear, the prior art has failed and continued to fail to provide a suitable reverse drive mechanism.

SUMMARY

In general, the invention features a motorcycle wheel attachment that is generally used as a replacement for a rear wheel sheave or sprocket of the motorcycle. In general, the outer perimeter of the attachment apparatus resembles the outer perimeter of the replaced motorcycle sheave/sprocket so that the respective drive belt or chain can be affixed around the perimeter. As such, from the viewpoint of the belt or chain as well as the engine and transmission, the attachment functionally replaces the sheave/sprocket. However, the attachment apparatus includes an enclosed inner gear system having a locked position and an unlocked position. In the locked position, none of the gears rotate with respect to the exterior of the attachment. In the unlocked position, the gears couple to the movement of the exterior of the attachment as well as the drive force exerted by the belt or chain. This coupled movement allows the attachment and thereby the rear motorcycle wheel to rotate in a reverse direction using the forward drive of the engine, thereby allowing the motorcycle to have reverse power.

In general, the embodiments described herein typically implement a planetary ring and sun gear arrangement into which a locking mechanism shifts to lock into the planetary ring and sun gear arrangement for a locked forward position, or to shift out of the planetary ring and sun gear arrangement for an unlocked reverse position. In one embodiment, a steel ball arrangement is implemented as the locking mechanism. In another embodiment, a drive lock gear is implemented as a locking mechanism.

In general, in one aspect, the invention features a motorcycle attachment apparatus, including an enclosed hub assembly, a shift assembly coupled to the hub assembly and a shift knob connected to the shift assembly.

In one implementation, the hub assembly includes an inner wheel drive component, an outer belt driven component coupled to the inner wheel drive component and a shift locking component coupled to the inner wheel drive component and the outer belt driven component.

In another implementation, the inner wheel drive component includes an inner guide, a sun gear connected to the inner guide, an inner drive lock plate connected to the sun gear and a shift disk guide connected to the inner drive lock plate.

In another implementation, the outer belt driven component includes an outer guide, a ring gear connected to the outer guide, a sprocket connected to the ring gear and an outer drive lock plate connected to the sprocket.

In another implementation, the a shift locking component comprises a lock release ring connected to a shift disk.

In still another implementation, the shift disk guide is in partial mechanical contact with the shift disk.

In yet another implementation, the inner and outer drive lock plates are coplanar and concentrically arranged.

In another implementation, the apparatus further includes lock balls located between and coupling the inner and drive lock plates.

In another implementation, the inner and outer guides are coplanar and concentrically arranged.

In another implementation, the apparatus further includes a planetary cage in mechanical contact with the inner and outer guides.

In another implementation, at least one planetary gear is located between the ring gear and the sun gear, coupling the ring gear and the sun gear.

In another implementation, the outer belt driven component is coupled to the inner wheel drive component by at least one planetary gear.

In another aspect, the invention features an apparatus for providing reverse power to a motorcycle having a rear wheel hub and a strut adjacent the rear wheel hub, the apparatus including an inner gear connected to the rear wheel hub, at least one planetary gear in engagement with the inner gear, an outer gear in engagement with the at least one planetary gear, an outer sprocket connected to the outer gear and means for fixing the at least one planetary gear with respect to the rear strut.

In another aspect, the invention features a motorcycle attachment apparatus, including an enclosed hub assembly having an inner gear, at least one planetary gear in engagement with the inner gear, an outer gear in engagement with the at least one planetary gear, and an outer sprocket connected to the outer gear, a shift assembly for fixing the at least one planetary gear with respect to the shift assembly and coupled to the enclosed hub assembly and a shift knob connected to the shift assembly for engaging the shift assembly with the at least one planetary gear.

One advantage of the invention is that the attachment uses the forward drive power of the motorcycle to power the motorcycle in the reverse direction.

Another advantage of the invention is that it can replace an existing wheel hub or be made as an integral part of the motorcycle wheel.

Another advantage of the invention is that the attachment can be fitted without modifying the existing motorcycle at all, with the exception of the removal of the existing hub.

Another advantage of the invention is reverse power can be engaged for difficult environmental conditions such as slopes, hills, inclines, limited space, road conditions, passengers, rear foot pads, weather conditions, and the like.

Another advantage of the invention is that overall motorcycle handling is increased.

Another advantage of the invention is that smaller riders can handle larger motorcycles.

Another advantage of the invention is that the use of motorcycle/side car combinations and motorcycle trailers is enhanced.

Other objects, advantages and capabilities of the invention will become apparent from the following description taken in conjunction with the accompanying drawings showing the preferred embodiment of the invention.

DETAILED DESCRIPTION

In general, the embodiments described herein replace the belt drive sheave or chain drive sprocket at the rear tire hub of any motorcycle that does not incorporate an in-line drive shaft application in order to engage or disengage engine powered reverse action as required. For illustrative purposes, the embodiments disclosed herein have been described for use with Harley-Davidson FLH series models. It is understood that the embodiments described herein can be easily altered to accommodate the structure and dimensions of the rear tire wheel hub assembly and rear strut and swing arm characteristics.

The typical embodiments described herein incorporate an internal planetary gear system that can be locked into place for forward motion and released to obtain reverse motion. A typical embodiment replaces the entire existing factory rear belt sheave or sprocket. A shift module is further connected to the motorcycle to enable shift from forward to reverse directions. The module is typically connected to the motorcycle's swing arm. In a typical implementation, the embodiments can be added with the same effort involved with changing the rear tire.

Figure 1:
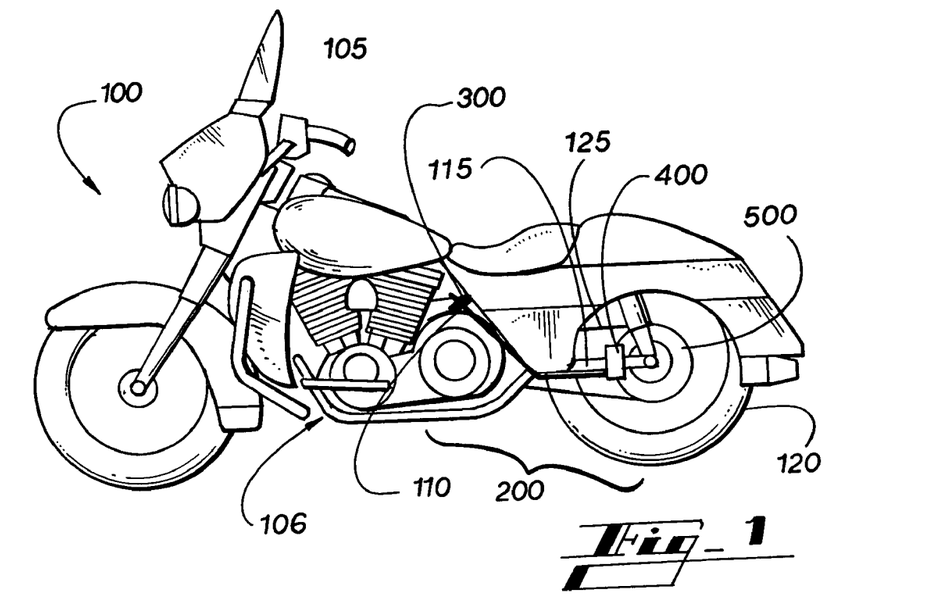
FIG. 1 illustrates a side view of a motorcycle having an embodiment of a hub assembly attachment apparatus.

Referring to the drawings wherein like reference numerals designate corresponding parts throughout the several figures, reference is made first to FIG. 1 that illustrates a side view of a motorcycle 100 having an embodiment of a hub assembly attachment apparatus 200. The apparatus 200 typically includes three basic components, including a reverse shift knob 300, a shift assembly 400 and a reverse module 500. In a typical implementation, the reverse shift knob 300 is connected to a location accessible to the rider, typically on the handle bars 105, motorcycle frame 106, saddlebag protection bar or a location 110 adjacent the user's legs. The shift assembly 400 is typically connected to the strut 115 of the motorcycle 100. The reverse module 500 is connected directly to wheel 120 of the motorcycle, replacing the existing sheave or sprocket as mentioned above. The existing timing belt or drive chain 125 is replaced and placed around the perimeter of the reverse module. Upon installation, forward power is used as normal. When a reverse direction is desired, the user pulls the shift knob 300 which releases a spring loaded locking mechanism (described below) from a planetary gear system (described below) internal to the reverse module 500. The planetary gears direct the forward power to a reverse direction on the rear wheel thus giving full forward power to a reverse direction.

Figure 2:
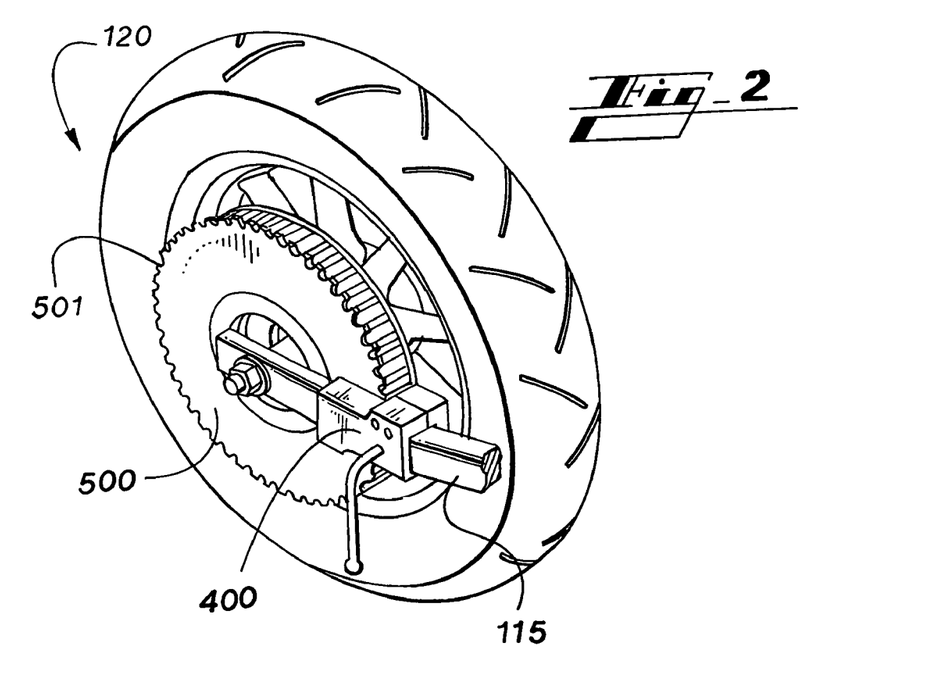
FIG. 2 illustrates a perspective view of a motorcycle wheel having an embodiment of a hub assembly attachment apparatus.

FIG. 2 illustrates a perspective view of a motorcycle wheel 120 having an embodiment of a hub assembly attachment apparatus, or reverse module 500. The shift assembly 400 is also illustrated as connected to the strut 115. The timing belt/drive chain is removed for illustrative purposes. It is appreciated that the outer toothed perimeter 501 exists and therefore accurately mimics the removed sheave or sprocket so that the belt or chain "sees" the same perimeter and therefore operates in the same manner as with the original sheave or sprocket. Therefore, there are no operational differences in the forward direction with respect to the chain or belt. In addition, as is appreciated further below, there are no operational differences with respect to the chain or belt when the module 500 is placed in the reverse direction. As is described further below, there are significant operational changes interior to the module 500 as compared to the original sheave or sprocket.

Figure 3:
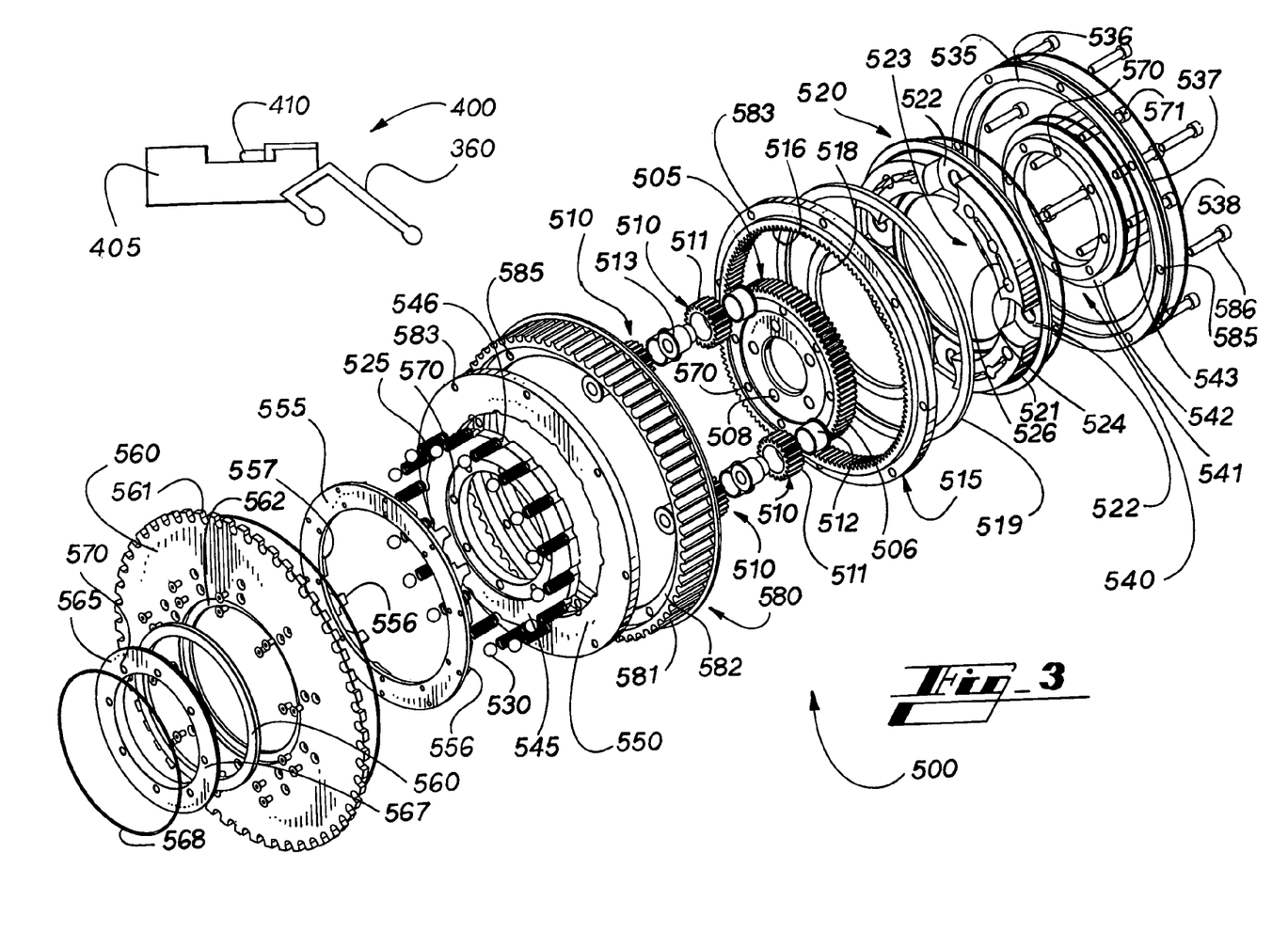
FIG. 3 illustrates a perspective view of the constituent components of an embodiment of a hub assembly apparatus.

FIG. 3 illustrates a perspective view of the constituent components of an embodiment of a hub assembly apparatus, or reverse module 500. The significant structural and operational features of the module 500 are now described.

In general, the module 500 includes a sun gear 505 that connects directly to the hub of the rear wheel 120 as shown above. The sun gear 505 therefore acts as the direct attachment of the module 500 to the motorcycle wheel 120. The sun gear 505 includes outer gear teeth 506. The sun gear is surrounded by and connected to a plurality of planetary gears 510 that include outer teeth 511. The outer teeth 506 of the sun gear are engaged with the outer teeth 511 of the planetary gears 510. In a typical embodiment, the planetary gears include an inner bushing 512 and stud shaft 513, which are discussed further in the description below. The module 500 further includes a ring gear 515 having inner teeth 516. The outer teeth 511 of the planetary gears 510 are engaged with the inner teeth 516 of the ring gear 515. It is therefore appreciated that the sun gear 505, the planetary gears 510 and the ring gear 515 are generally coplanar in assembled form and that the planetary gears 510 are held in between the sun gear 510 and the ring gear 515.

A planetary cage 520 is generally in mechanical contact with a portion of the ring gear 515, generally lying flush against the ring gear 515. Typically, an inner busing 518 and outer bushing 519 are interposed between the mechanical contact between the gear ring 515 and the planetary cage 520. The planetary cage 520 generally includes a planetary wall 521 having planetary chambers 522 into which the planetary gears 510 are held and contained. Although held and contained within the planetary chambers 522, the planetary gears 510 are free to rotate within the planetary chambers 522 when the module 500 is in the unlocked position as further described below. The planetary cage 520 further includes a series of female lock keys 523 which each include a cylindrical chamber 524 into which a resilient body 525 is held. In general, the resilient body 525 is a compression spring that protrudes slightly from the chamber 524 when the spring is uncompressed, which is when the module 500 is in the locked position. Sitting atop each resilient body 525 is a lock ball 530, typically a ball bearing. Furthermore, a resilient body 525 is located within each of the stud shafts 513 of each of the planetary gears 510. A lock ball 530 is further located atop each of the resilient bodies 525 located in the stud shafts 513. An outer planetary guide 535 having a lip 536 is in mechanical contact with the planetary cage 520. Furthermore, an inner planetary guide 540 having a lip 541 is in mechanical contact with the planetary cage 520. In this arrangement, the planetary cage 520 is cradled on the lips 536, 541 of the outer and inner guides 535, 540. The outer and inner guides 535, 540 typically include outer indentations 537, 542 having O-rings 538, 543.

The module 500 further includes an inner drive lock plate 545 and an outer drive lock plate 550. The inner and outer drive lock plates 545, 550 are generally coplanar and concentric, the inner drive lock plate 545 being concentrically arranged with the outer drive lock plate 550. The inner drive lock plate 545 includes a series of generally semi-circular indentations 546. The outer drive lock plate 550 generally includes a series of generally semi-circular indentations 551. When the module 500 is in the locked position, the lock balls 530 are located between the inner and outer drive lock plates 545, 550 and within the indentations 546,551. This location of the lock balls 530 thereby couples the inner and outer drive lock plates 545, 550 to one another and prevents them from rotating with respect to one another. It is understood that there is a finite spacing between the concentrically arranged inner and outer drive lock plates 545, 550. A lock release ring 555 is generally arranged just above and generally parallel the inner and outer drive lock plates 545, 550. The lock release ring 555 includes a series of male lock keys 556 that are mated with the female lock keys 523 on the planetary cage 520. When the module 500 is in the locked position, the male lock keys are generally located adjacent and in between the lock balls 530. It is appreciated from FIG. 3 that some of the male lock keys 556 protrude further than other of the male lock keys 556. In general, there are a number of male lock keys 556 that are positioned above the planetary gears 510 adjacent the lock balls 530 positioned above the planetary gears 510. The remaining of the male lock keys 556 are positioned adjacent the chambers 524, the protruding male lock keys 556 being positioned with slots 526 that are coupled to and adjacent the chambers 524. The male lock keys 556 further include an angled edge 557 that tapers from the connection point of the male locks keys 556 to the lock release ring 555 to the end of the male lock keys 556.

The lock release ring 555 is connected to a shift disk 560 that includes outer engagement teeth 561. A shift disk guide 565 is in mechanical contact with the shift disk 560. In general, the shift disk 560 includes and inner lip 562 in which the shift disk guide is in mechanical contact. In a typical embodiment, a bushing 566 is interposed between the shift disk guide 565 and the lip 562 of the shift disk 560. In addition, the shift disk guide 565 includes an outer indentation 567 in which an O-ring 568 is located.

In the fully assembled state, the sun gear 505 is connected to the inner guide 540 from one side as shown. The other side of the sun gear 505 is connected to the inner drive lock plate 545 from the other side. The inner drive lock plate is further connected to the shift disk guide 565. Each of the sun gear 505, the inner guide 540, inner drive lock plate 545 and shift disk guide 565 include through holes 570 into which suitable connection devices 571, such as screws connect the sun gear 505, the inner guide 540, inner drive lock plate 545 and shift disk guide 565 to one another as described. As mentioned above, the sun gear 505 connects directly to the motorcycle wheel hub. This connection is achieved via connections holes 508.

The module 500 further includes a belt/chain sprocket 580 that includes outer sprocket teeth 581 and an inner lip 582. The sprocket 580 is for direct connection to the belt or chain of the motorcycle 100, which replaced the prior sheave/sprocket as described above.

In the fully assembled state, the outer drive lock plate 550 is connected to one side of the lip 582 of the sprocket 580 as shown. The ring gear 515 is connected to the other side of the lip 582 of the sprocket 580 as shown. The ring gear 515 is further connected to the outer guide 535 of the planetary cage 520. Each of the ring gear 515, the outer guide 535, the outer drive lock plate 550, and the sprocket 580 include through holes 585 into which suitable connection devices 586, such as screws connect the ring gear 515, the outer guide 535, the outer drive lock plate 550, and the sprocket 580 connect as described.

It is therefore appreciated that the sun gear 505, the inner guide 540, inner drive lock plate 545 and shift disk guide 565 are connected together and therefore are effectively a single piece when assembled. This single piece can be considered the inner wheel drive component. In addition, it is further appreciated that the ring gear 515, the outer guide 535, the outer drive lock plate 550, and the sprocket 580 are connected together and therefore also effectively a single piece. This single piece can be considered an outer belt driven component. Furthermore, the lock release ring 555 is connected to the shift disk 560 and therefore are effectively another single piece. This third piece can be considered the shift locking component. The inner wheel drive component and the outer belt driven component are coupled together via the planetary gears 510, but are inhibited from moving with respect to each other and therefore locked together via the lock balls 530. In addition, the shift locking component is held adjacent the inner wheel drive component and the outer belt driven component with the lock release ring 555 positioned above the inner and outer drive lock plates 545, 550 as described above. Therefore, in this locked position, the module 500 moves as a single unit, virtually identical the prior and replaced sprocket/sheave. Therefore, when installed, the sun gear 505 is connected directly to the motorcycle wheel hub via the through-holes 508 and the belt or chain is placed around the perimeter of the sprocket 580. In this locked (or forward) state, the module 500 receives drive power from the engine via the belt or chain and power is transferred directly to the wheel as normal.

FIG. 3 further illustrates an embodiment of the shift assembly 400, which generally includes a main body 405 that is adapted to be connected to the swing arm of the motorcycle as described above. The placement of the shift assembly is such that locking teeth 410 of the shift assembly 400 are aligned with the teeth 561 of shift disk 560. In this way, when a shift knob 300 is engaged by the rider, the locking teeth 410 engage and disengage with the teeth 561 of the shift disk 560. The knob 300 thereby allows the locking teeth 410 to extend and retract form a portion of the main body 405.

Figures 4, 5:
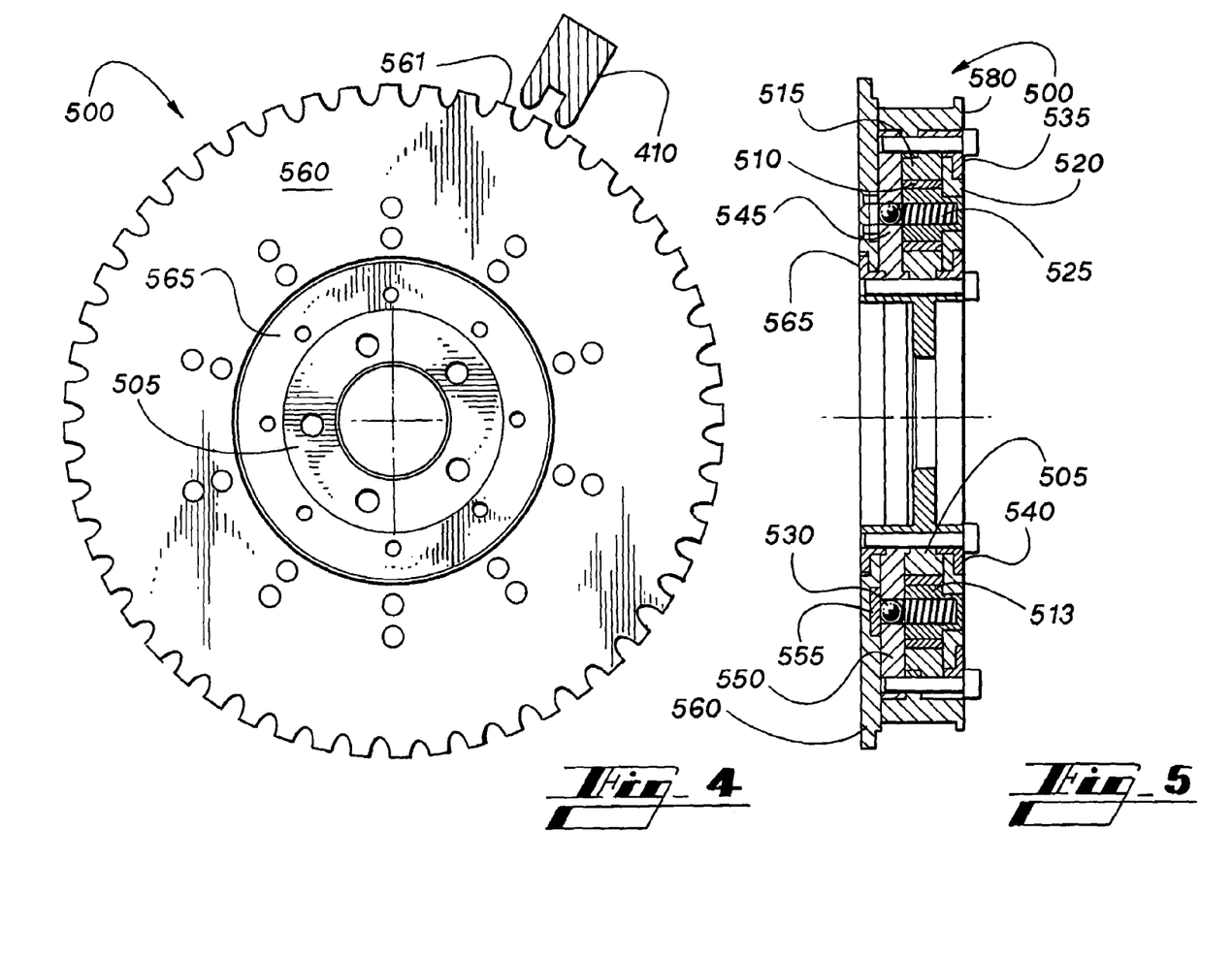
FIG. 4 illustrates a side view of an embodiment of a hub assembly apparatus in a locked position.
FIG. 5 illustrates a top view of an embodiment of a hub assembly apparatus in a locked position.

FIG. 4 illustrates a side view of an embodiment of a hub assembly apparatus 500 in the locked position. In this locked position, the module 500 rotates as a single unit as described above. Therefore, as shown, the sun gear 505, attached directly to the hub of the rear wheel, the shift disk guide 565 and the shift disk 565 all rotate together in the normal forward position. Therefore, from the perspective of the motor, the belt/chain and the rest of the motorcycle, there are no functional differences than with the prior sprocket/sheave. The teeth 410 of the shift assembly 400 are shown as disengaged from the teeth 561 of the shift disk 560.

FIG. 5 illustrates a top view of an embodiment of a hub assembly apparatus 500 in a locked position. The figure illustrates, among other things, the sun gear 505, the planetary gears 510, inner bushing 512 and stud shaft 513, the ring gear 515, the planetary cage 520, the inner busing 518 and outer bushing 519, the resilient bodies 525, the lock balls 530, the outer planetary guide 535, the inner planetary guide 540, the inner drive lock plate 545 and the outer drive lock plate 550, the lock release ring 555, the shift disk 560 and the belt/chain sprocket 580. The components are connected together as described with respect to FIG. 3. In this locked state, the lock balls 530 are held between the inner drive lock plate 545 and the outer drive lock plate 550 that lock all of the components together as a single unit 500.

However, the module 500 can be placed in an unlocked position in which the inner gear system puts the module 500 into a reverse mode. The reverse shift knob 300 can be engaged by the user which activates the shift assembly 400 as is now described.

Figure 6:
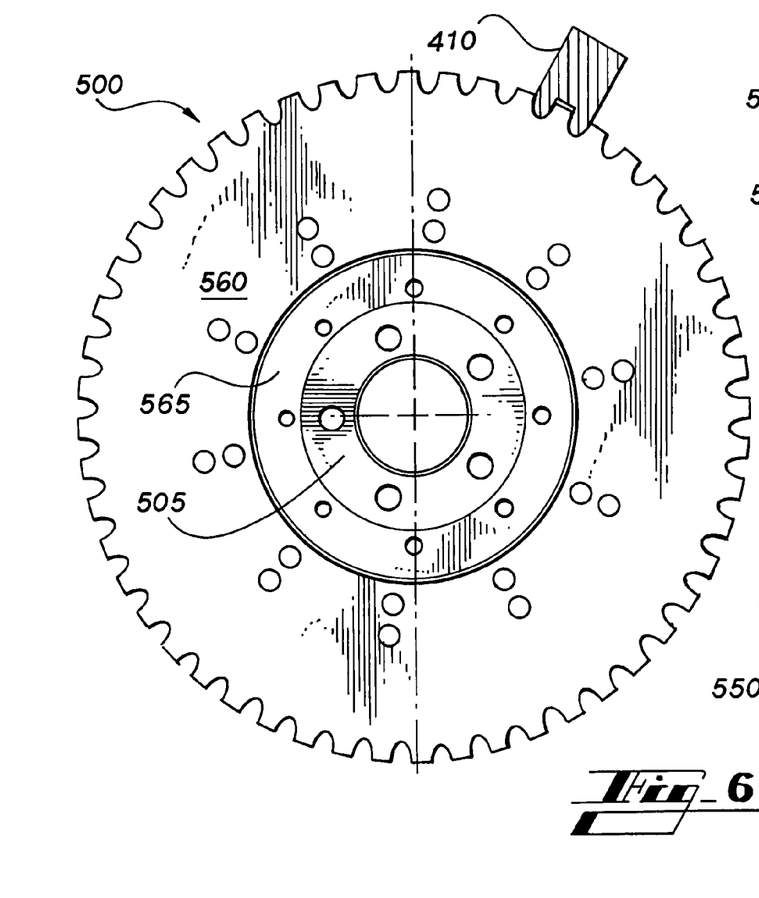
FIG. 6 illustrates a side view of an embodiment of a hub assembly apparatus in an unlocked position.

FIG. 6 illustrates a side view of an embodiment of a hub assembly apparatus 500 in an unlocked position. In this unlocked position, the module 500 no longer rotates as a single unit as described above. Since the shift assembly 400 is fixed to the swing arm, the shift disk 560 as well as the lock release ring 555, which is connected directly to the shift disk 560, are also now fixed with respect to the swing arm. Therefore, the shift disk 560 no longer rotates. In order to move the motorcycle in reverse, the rider still puts the transmission into gear, preferably the low first gear and then releases the clutch as normal. However, in this reverse unlocked mode, the module 500 now performs uniquely. With the shift disk 560 and therefore the lock release 555 ring in a fixed position, when power is applied to the sprocket 580, the entire module 500, except the shift disk 560 and release ring 555, momentarily moves in the forward direction. However, since the lock release ring 555 is stationary with respect to the rest of the module 500, the lock balls 530 now push into the male lock keys 556 and along the angled edge 557. The angled edge 557 therefore redirects the lock balls 530 into the planetary cage 520, and more specifically into the cylindrical chambers 524 of the female lock keys 523. For those lock balls 535 positioned over the planetary gears 510, the lock balls 530 are redirected into the stud shafts 513. During this redirection, the resilient bodies 525 are compressed. Furthermore, the male lock keys 556 are held within the female lock key slots 526. This mated engagement further locks the planetary cage 520 into a fixed position, along with the shift disk 560 and the lock release ring 555.

Figure 7:
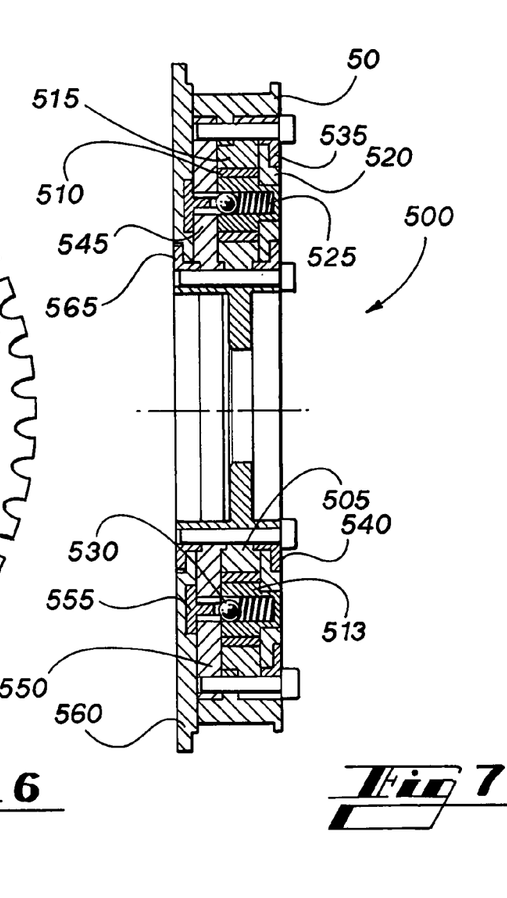
FIG. 7 illustrates a top view of an embodiment of a hub assembly apparatus in an unlocked position.

FIG. 7 illustrates a top view of an embodiment of a hub assembly apparatus 500 in an unlocked position. The figure illustrates, among other things, the sun gear 505, the planetary gears 510, inner bushing 512 and stud shaft 513, the ring gear 515, the planetary cage 520, the inner busing 518 and outer bushing 519, the resilient bodies 525, the lock balls 530, the outer planetary guide 535, the inner planetary guide 540, the inner drive lock plate 545 and the outer drive lock plate 550, the lock release ring 555, the shift disk 560 and the belt/chain sprocket 580. The components are connected together as described with respect to FIG. 3. In this unlocked state, the lock balls 530 are now unlocked from between the inner drive lock plate 545 and the outer drive lock plate 550 and held within the chambers 524 and stud shafts 513 as described above. The inner drive lock plate 545 and the outer drive lock plate 550 are now free to move with respect to each other.

As described above, the sun gear 505, the inner guide 540, inner drive lock plate 545 and shift disk guide 565 are connected together as the inner wheel drive component. In addition, the ring gear 515, the outer guide 535, the outer drive lock plate 550, and the sprocket 580 are connected together as the outer belt driven component. The lock release ring 555 is connected to the shift disk 560 as the shift locking component. In addition, the planetary cage 520 is fixed to the shift locking component. In addition, the inner wheel drive component and the outer belt driven component are coupled together via the planetary gears 510. With the lock balls 530 removed, the inner wheel drive components and the outer belt driven component can now move independently of each other but be coupled by the planetary gears 510, which are held fixed in the planetary chambers 522 but free to rotate within the chambers 522. In a typical embodiment, the bushings 518, 519, 560 are a heat resistant material that dissipates heat rapidly, such as Teflon, to withstand the frictional heat now present between the inner wheel drive component, the outer belt driven component and the shift locking component.

Figure 15:
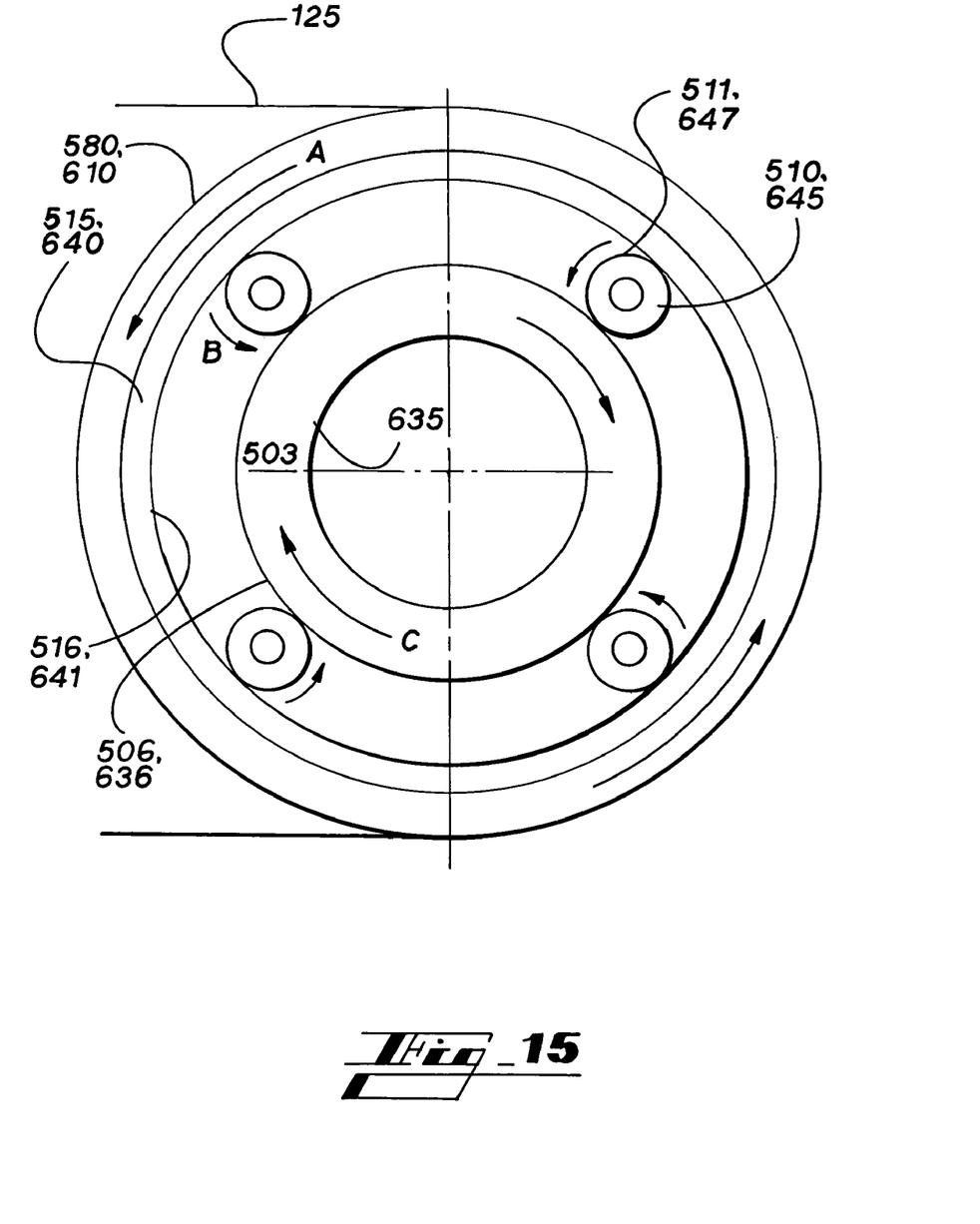
FIG. 15 illustrates embodiments of outer gears, planetary gears and inner gears

Referring now to FIG. 15, the essential components are now discussed that result in a reverse motion. In the reverse mode, the belt or chain 125 applies power from the motor to the sprocket 580 as normal, in the direction indicated by arrow A. This power is directed immediately to the outer drive lock plate 550 and thus to the ring gear 515. The teeth 516 of the ring gear 515 are in engagement with the teeth 511 of the planetary gears 510. Therefore, the power of the ring gear 515 is immediately transferred to the planetary gears 510, rotating them in the direction indicated by arrow B. The teeth 511 of the planetary gears 510 are engaged with the teeth 506 of the sun gear 505, which rotates the sun gear 505 in the direction indicated by arrow C, which is in the opposite direction of the applied power in the direction indicated by arrow A. Since the sun gear 505 is attached directly to the rear wheel of the motorcycle, the rear wheel now moves in reverse under the power normally directed into the forward direction. Therefore, from the perspective of the motor, the belt/chain and the rest of the motorcycle, there are still no functional differences than with the prior sprocket/sheave, except the reverse power is available when the shift assembly 400 is engaged with the shift disk 560.

When the rider no longer desires the reverse direction, the rider engages the shift knob 300 which removes the locking teeth 410 from engagement with the teeth 561 on the shift disk 560. Since the lock balls 530 are spring loaded, they typically restore to their position between the inner drive lock plate 545 and the outer drive lock plate 550, thereby locking the module 500 once again for forward motion.

Alternate Embodiment

Figure 8:
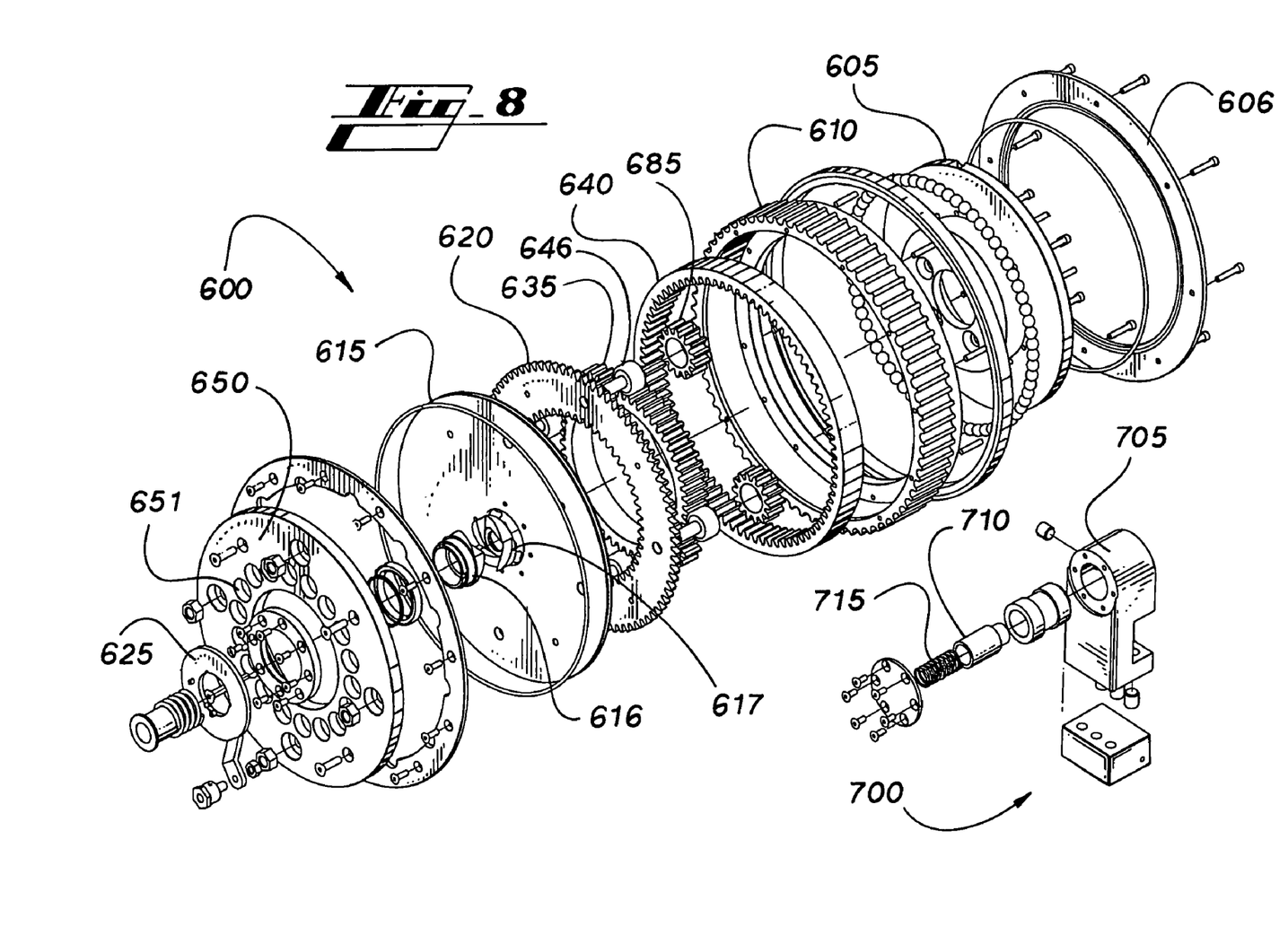
FIG. 8 is a perspective view of the constituent components of an alternate embodiment of a hub assembly apparatus, and an embodiment of a corresponding shift assembly.

FIG. 8 is a perspective view of the constituent components of an alternate embodiment of a hub assembly apparatus 600, and an embodiment of a corresponding shift assembly 700. In general, the embodiment now described implements the same basic planetary system as with the other embodiments described above. The shift assembly 700 is connected to the strut/swing arm of the motorcycle similarly to the embodiments described above. The shift assembly generally includes a main body 705 and lock pin 710 that is spring loaded by spring 715.

In general, a wheel hub inner bearing housing 605 is connected to the rear wheel of the motorcycle. An outer cover 606 rests against the housing 605. An outer sprocket 610 similarly accepts the belt/chain of the motorcycle. A drive plate 615 is connected to a drive plate lock gear 620. The drive plate 615 includes a stationary cam 616 in engagement with a moveable cam 617 that is connected to a drive lock shift lever 625. A compression spring 630 typically keeps the cams 616, 617 engaged when the module 600 is in the locked position and moves together as a single unit. A planetary drive lock ring 650 is further connected to the drive plate 615.

An inner planetary ring 635 is connected to the wheel hub inner bearing housing 605. An outer planetary ring 640 is connected to the outer sprocket 610. Planetary gears 645 are interposed and in engagement with the inner and outer planetary rings 635, 640. The planetary gears 645 include stud shaft 646 that are connected to the drive plate 615 and the drive plate lock gear 620. In the locked position, the drive plate lock gear 620 is in engagement with the outer planetary ring 640.

When the rider engages the shift knob 300, a cable pulls the drive lock shift lever 625 which rotates the moveable cam 617 which rotates with respect to the fixed cam 616, thereby pulling the drive plate 615, drive plate lock gear 620 and planetary drive lock ring 650. This lifting action disengages the drive plate lock gear 620 from the outer planetary ring 640. During this lifting process, a number of indentations 651 on the planetary drive lock ring are also lifted toward the locking pin 710 of the shift assembly. After either a direct engagement or a small rotation, the locking pin engages with one of the indentations 651 thereby holding the drive plate 615, drive plate lock gear 620 and planetary drive lock ring 650 fixed with respect to the strut. Since the stud shafts 646 are also connected to the drive plate 615, drive plate lock gear 620 and planetary drive lock ring 650, the planetary gears 645 are also held stationary.

Referring again to FIG. 15, the essential components are now discussed that result in a reverse motion. In the reverse mode, the belt or chain 125 applies power from the motor to the sprocket 610 as normal, in the direction indicated by arrow A. This power is directed immediately to the outer planetary ring 640. The teeth 641 of the outer planetary ring 640 are in engagement with the teeth 647 of the planetary gears 645. Therefore, the power of the outer planetary ring 640 is immediately transferred to the planetary gears 645, rotating them in the direction indicated by arrow B. The teeth 647 of the planetary gears 645 are engaged with the teeth 636 of the inner planetary ring 635, which rotates the inner planetary ring 635 in the direction indicated by arrow C, which is in the opposite direction of the applied power in the direction indicated by arrow A. Since the inner planetary ring 635 is attached to the wheel hub inner bearing housing 605 that is directly to the rear wheel of the motorcycle, the rear wheel now moves in reverse under the power normally directed into the forward direction. Therefore, from the perspective of the motor, the belt/chain and the rest of the motorcycle, there are still no functional differences than with the prior sprocket/sheave, except the reverse power is available when the shift assembly 700 is engaged with the planetary drive lock ring 650.

Figures 9, 10:
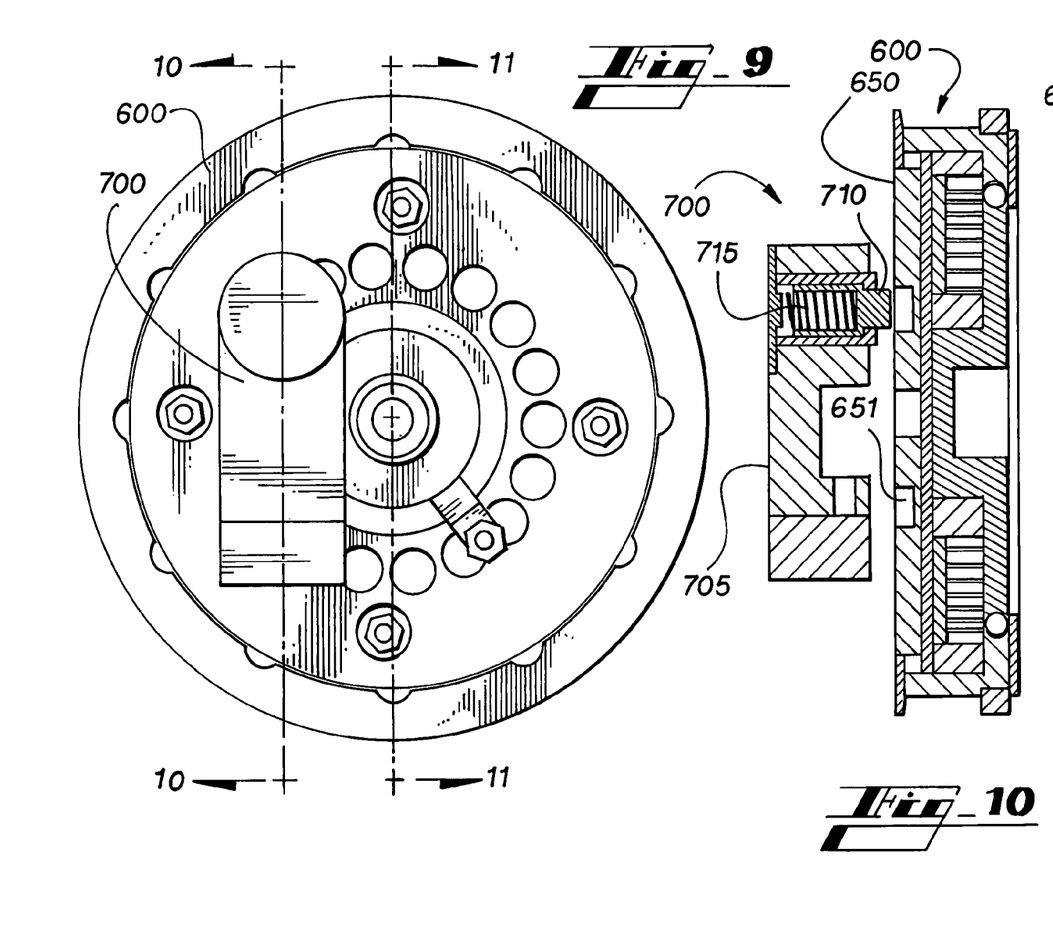
FIG. 9 illustrates a side view of an alternate embodiment of a hub assembly apparatus in a locked position.
FIG. 10 illustrates a top view of an alternate embodiment of a hub assembly apparatus in a locked position.
Figure 11:
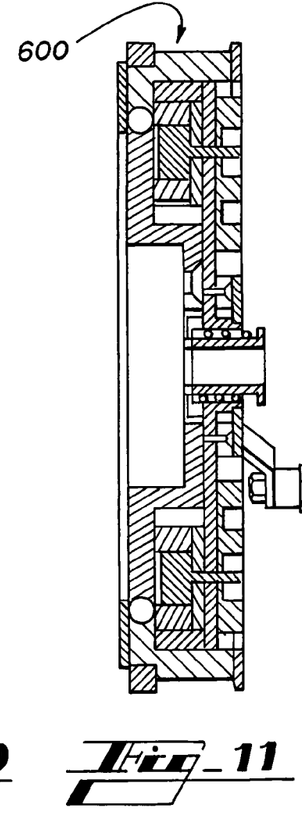
FIG. 11 illustrates another top view of an alternate embodiment of a hub assembly apparatus in a locked position.

The following figures illustrate the module 600 in the locked position. FIG. 9 illustrates a side view of an alternate embodiment of a hub assembly apparatus 600 in a locked position. FIG. 10 illustrates a top view of an alternate embodiment of a hub assembly apparatus 600 in a locked position, showing the planetary drive lock ring 650 removed from the locking pin 700. FIG. 11 illustrates another top view of an alternate embodiment of a hub assembly apparatus 600 in a locked position.

Figures 12, 13:
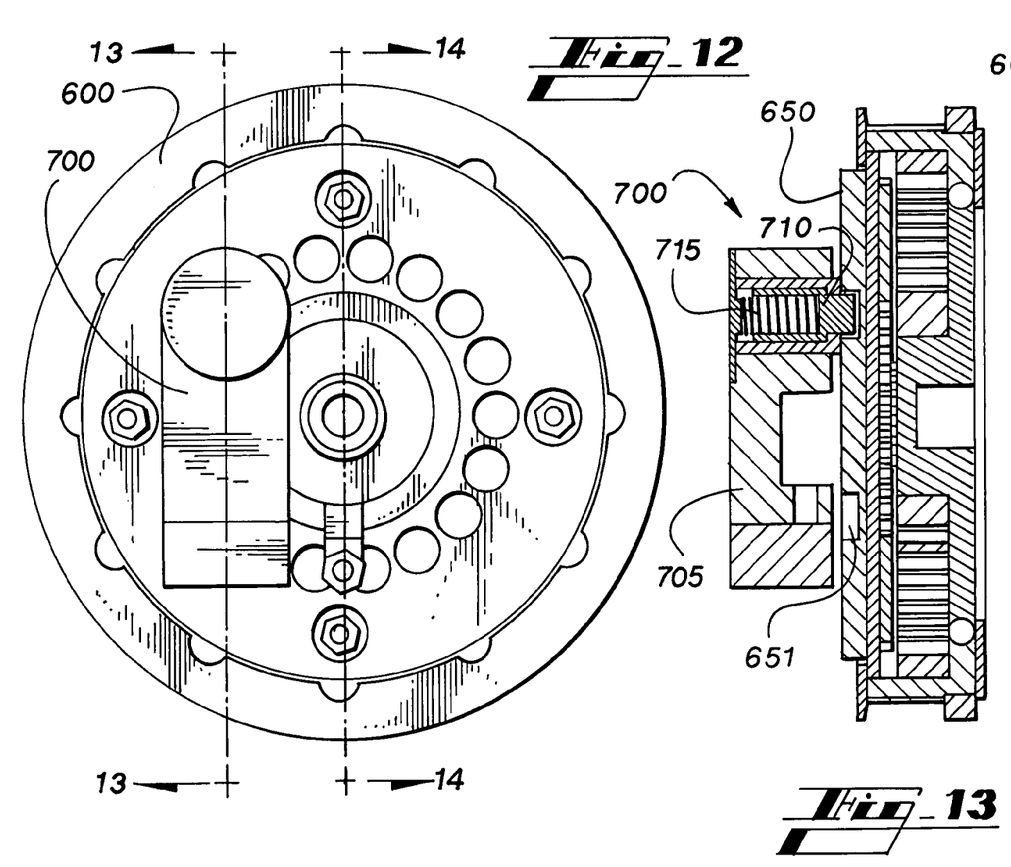
FIG. 12 illustrates a side view of an alternate embodiment of a hub assembly apparatus in an unlocked position.
FIG. 13 illustrates a top view of an alternate embodiment of a hub assembly apparatus in an unlocked position.
Figure 14:
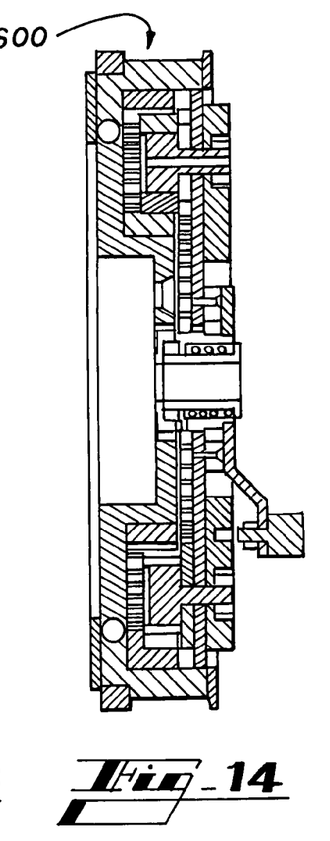
FIG. 14 illustrates another top view of an alternate embodiment of a hub assembly apparatus in an unlocked position.

The following figures illustrate the module 600 in the unlocked position. FIG. 12 illustrates a side view of an alternate embodiment of a hub assembly apparatus 600 in an unlocked position. FIG. 13 illustrates a top view of an alternate embodiment of a hub assembly apparatus 600 in an unlocked position, showing the planetary drive lock ring 650 lifted from the module 600 as described above and engaged with the locking pin 700. FIG. 14 illustrates another top view of an alternate embodiment of a hub assembly apparatus 600 in an unlocked position.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A motorcycle attachment apparatus, comprising:
   an enclosed hub assembly;
   a shift assembly coupled to the hub assembly; and
   a shift knob connected to the shift assembly,
   wherein the hub assembly further comprises:
   an inner wheel drive component;
   an outer belt driven component coupled to the inner wheel drive component; and
   a shift locking component coupled to the inner wheel drive component and the outer belt driven component, said shift locking component further comprising a lock release ring connected to a shift disk;
   wherein the inner wheel drive component further comprises:
   an inner guide;
   a sun gear connected to the inner guide;
   an inner drive lock plate connected to the sun gear; and
   a shift disk guide connected to the inner drive lock plate; and,
   wherein the outer belt driven component further comprises:
   an outer guide;
   a ring gear connected to the outer guide;
   a sprocket connected to the ring gear; and
   an outer drive lock plate connected to the sprocket.

2. The apparatus as claimed in claim 1, wherein the shift disk guide is in partial mechanical contact with the shift disk.

3. The apparatus as claimed in claim 1, wherein the inner and outer drive lock plates are coplanar and concentrically arranged.

4. The apparatus as claimed in claim 3 further comprising lock balls located between and coupling the inner and drive lock plates.

5. A motorcycle attachment apparatus, comprising:
   an enclosed hub assembly;
   a shift assembly coupled to the hub assembly; and
   a shift knob connected to the shift assembly,
   wherein the hub assembly further comprises:
   an inner wheel drive component further comprising
   an inner guide;
   a sun gear connected to the inner guide;
   an inner drive lock plate connected to the sun gear; and an outer belt driven component coupled to the inner wheel drive component, the outer belt driven component further comprising:

an outer guide;

a ring gear connected to the outer guide;

a sprocket connected to the ring gear;

an outer drive lock plate connected to the sprocket;

a shift locking component coupled to the inner wheel drive component and the outer belt driven component;

and a shift disk guide connected to the inner drive lock plate, wherein the inner and outer guides are coplanar and concentrically arranged.

6. The apparatus as claimed in claim 5, further comprising a planetary cage in mechanical contact with the inner and outer guides.

7. The apparatus as claimed in claim 5, wherein at least one planetary gear is located between the ring gear and the sun gear, coupling the ring gear and the sun gear.

8. The apparatus as claimed in claim 1, wherein the outer belt driven component is coupled to the inner wheel drive component by at least one planetary gear.

* * * * *